428-408 SR
3/16/82 XR 4,320,170

United States Patent [19] [11] 4,320,170
Findlay [45] Mar. 16, 1982

[54] POLYURETHANE RIBBON FOR NON-IMPACT PRINTING

[75] Inventor: Hugh T. Findlay, Lexington, Ky.

[73] Assignee: International Business Machines Corporation, Armonk, N.Y.

[21] Appl. No.: 213,984

[22] Filed: Dec. 8, 1980

[51] Int. Cl.[3] .......................... B32B 9/04; B41J 31/00; B32B 27/40

[52] U.S. Cl. .................................... 428/336; 101/467; 400/118; 400/119; 400/120; 400/241.1; 400/241.4; 428/323; 428/337; 428/408; 428/423.1; 428/425.8; 428/458; 428/913; 428/914

[58] Field of Search ..................... 428/328, 408, 423.1, 428/323, 425.8, 913, 914, 458, 336, 337; 400/118, 119, 120, 241.1, 241.4; 101/467

[56] References Cited

U.S. PATENT DOCUMENTS

| | | | |
|---|---|---|---|
| 2,713,822 | 7/1955 | Newman | 101/467 |
| 2,871,218 | 1/1959 | Schollenberger | 260/45.4 |
| 3,744,611 | 7/1973 | Montanari et al. | 346/76 |
| 4,103,066 | 7/1978 | Brooks et al. | 428/337 |
| 4,112,178 | 9/1978 | Brown | 428/306 |
| 4,158,715 | 6/1979 | Surreth | 428/480 |
| 4,189,514 | 2/1980 | Johnson | 428/922 |
| 4,269,892 | 5/1981 | Shattuck | 428/337 |

FOREIGN PATENT DOCUMENTS

| | | |
|---|---|---|
| 849136 | 9/1960 | United Kingdom . |
| 1025970 | 4/1966 | United Kingdom . |

OTHER PUBLICATIONS

*Solid Polyurethane Elastomers,* P. Wright and A. P. C. Cumming, published in 1969 by Maclaren and Sons, London, p. 180.

*Primary Examiner*—Ellis P. Robinson
*Attorney, Agent, or Firm*—John A. Brady

[57] ABSTRACT

A ribbon for thermal printing comprising a transfer coating and a substrate which is a polyurethane resin containing electrically conductive carbon black.

15 Claims, No Drawings

POLYURETHANE RIBBON FOR NON-IMPACT PRINTING

DESCRIPTION

Technical Field

The present invention is concerned with a ribbon for use in non-impact printing. In particular, it is concerned with a resistive ribbon for use in a process in which printing is achieved by transferring ink from a ribbon to paper by means of local heating of the ribbon. Localized heating may be obtained, for example, by contacting the ribbon with point electrodes and a broad area contact electrode. The high current densities in the neighborhood of the point electrodes during an applied voltage pulse produce intense local heating which cause transfer of ink from the ribbon to a paper or other substrate in contact with the ribbon.

Background Art

Non-impact printing by thermal techniques of the kind here of interest is known in the prior art, as shown, for example, in U.S. Pat. Nos. 2,713,822 to Newman and 3,744,611 Montanari et al.

A polycarbonate resin containing conductive carbon black used as a substrate for a resistive ribbon is the subject of U.S. Pat. No. 4,103,066 to Brooks et al. The essence of this invention is in developing the use of polyurethane, and certain specific polyurethane formulations, instead of the polycarbonate of U.S. Pat. No. 4,103,066. Additionally, U.S. No. 4,269,892 to Shattuck et al, the content of which is acknowledged as being prior in law to this invention, discloses a pertinent ribbon with embodiments of polyester linked by various isocyanates. The functional groups created would include urethane functional groups at two points linking the polyester. No relevant development of polyurethane is known, however. U.S. Pat. No. 4,112,178 to Brown does teach a transfer medium for impact printing having a support layer of urethane closely similar to the urethane of the preferred formulation of this invention and which is coated from a water dispersion, a primary advantage of this invention.

SUMMARY OF THE INVENTION

The present invention is a laminated ribbon for thermal printing by generation of heat in the conductive layer. In its simplest form the invention may have a resistive layer, the layer being of polyurethane in accordance with this invention, and a transfer layer which responds to heat generated in the resistive layer.

The transfer layer may be any generally known formulation and does not constitute any novel contribution of this invention. The best practical designs of these ribbons have three or more layers. The third layer is a thin, conductive metal layers, preferably aluminum, between the resin conductive layer and the transfer layer. Further layers may be support layers positioned between the bottom, resin conductive layer and the top, transfer layer. The choice of number of layers and the characteristics of layers other than the resin resistive layer do not constitute any novel contribution of this invention.

Ribbons within the present state of the art, such as those having the polycarbonate substrate as described in the above-mentioned U.S. Pat. No. 4,103,066 and ribbons of other resin materials forming the conductive layer in combination with carbon black or the like, are capable of giving excellent results. Polycarbonate ribbons, despite having high tensile strength, tend to be quite brittle. Other resin materials are generally less brittle. Development of a ribbon of excellent characteristics is difficult because of the various requirements for good winding, unwinding, and storage, as well as for providing high quality thermal printing.

Another major factor is the minimizing of pollution during manufacture. Typically, organic solvents are a major part of a dispersion from which the resin conductive layer is formed. Such solvents often can not be fully recovered or such recovery is impractical, and any unrecovered solvent becomes an atmospheric pollutant. Recent government regulations exempt or are favorable toward solvent systems which have a high percentage of water as the vehicle.

It is accordingly a primary object of this invention to provide a thermal ribbon as described having good characteristics in effecting printing and in handling during ordinary use.

It is similarly an object of this invention to provide a thermal ribbon as described having a resinous resistive layer of desirable characteristics.

It is also a primary object of this invention to provide a thermal ribbon as described cast from a predominately aqueous dispersion.

In accordance with the present invention, the resistive layer is a polyurethane resin containing dispersed throughout it a conductive carbon black. The preferred formula is an aliphatic urethane resin with two parts by weight of the resin to one part by weight the carbon black.

A typical transfer layer comprises a resin or wax, carbon as a pigment, and, optionally, a dye. It may be applied during manufacture as a hot melt or fluid dispersion. The substrate of the present invention is suitable for use with any transfer coating having conventional characteristics.

The following examples are given solely for purposes of illustration and are not to be considered limitations of the invention, which is capable of various implementations and formulations within the scope of the invention.

BEST MODE FOR CARRYING OUT THE INVENTION

The preferred water borne formula is prepared by mixing and grinding together in a paint shaker for one hour equal volumes of steel shot and liquid components the first three items in the following formula, in the proportions show. The fourth item, the Neorez R-966, is mixed in after the grinding.

| Conductive Layer | % By Weight |
|---|---|
| (1) Neorez R-960* (Polyvinyl Chemical Industries aliphatic urethane dispersion) | 29.54 |
| (2) XC72 (Cabot Co. conductive carbon black) | 9.80 |
| (3) Water | 31.12 |
| (4) Neorez R-966** (Polyvinyl Chemical Industries aliphatic urethane | 29.54 |

-continued

| Conductive Layer | % By Weight |
|---|---|
| dispersion) | |

*Neorez R-960 consists of the following, by weight: 33% aliphatic urethane, 15% N methyl-2-pyrolidone; 1.2% ethylamine, and 50.8% water.
**Neorez R-966 consists of the following, by weight: 33% aliphatic urethane, 1.2% ethylamine, and 65.8% water.

Neorez R-960 and Neorez R-966 contain the same urethane. That urethane appears to have few polar or reactive functional groups other than the urethane linkages. Nevertheless, the material is described by its manufacturer a suited to be cross-linked at carboxyl functional groups in the urethane.

Three Layer Ribbon

The material is cast by a reverse roll coater onto a temporary release substrate. This may be a 4 millimeter thick polypropylene or polyethylene terephthalate (Imperial Chemical Industries) film. Drying is then conducted by forced hot air. The upper surface may then be metalized, preferably by vacuum deposition of aluminum to a thickness of 1000 Angstrom. The transfer layer is then coated on the aluminum layer as a fluid dispersion. After forced hot air drying the element is stripped from the temporary substrate and constitutes a three layer thermal ribbon as described. Thickness of the polyurethane conductive layer is 13 to 16 micron.

Four Layer Ribbon

The preferred formula is coated by the same technique on the metal side of a 0.14 millimeter thick commercially available aluminized polyethylene terephthalate. The preferred thickness of the aluminum layer is 1000 Angstrom. Upon drying by forced hot air the polyethylene terephthalate side is coated with the transfer layer, as a fluid dispersion and then dried by forced hot air. This is a four layer thermal ribbon as described. This ribbon exhibited excellent print quality at currents in the order of 30 to 40 milliamperes. Thickness of the polyurethane conductive layer is 10 to 16 micron.

A typical formula for the transfer layer which is entirely suitable in the best embodiment of this invention is as follows:

| Typical Transfer Layer | % By Weight |
|---|---|
| Versamid 871 (Henkel Corp. polyamide resin) | 18 |
| Furnace Carbon Black | 2 |
| Triphenyl Phosphate | 2 |
| Isopropyl Alcohol | 78 |

CHARACTERISTIC OF INVENTION

The preferred polyurethane conductive layer formula consists of 5.43% organic solvent in the total formula. Pollution regulations are typically based on weight of organic volatiles in 1 gallon excluding water. In the formulation organic volatiles per gallon are 1.44 lbs., well below typical regulations.

The ribbon exhibits much more elongation compared to an otherwise identical polycarbonate ribbon. This is an advantage since that characteristic provides resistance to tearing and a more compact windup on the spool. A compact windup allows greater ribbon length and correspondingly more characters of print from a spool. The resistivity of a resistive layer in accordance with the preferred formula is in order of magnitude of 0.6 ohm-centimeters.

What is claimed is:

1. A ribbon for non-impact thermal transfer printing having a thermal transfer layer and an electrically resistive substrate layer wherein the improvement comprises said resistive layer comprising polyurethane having predominately only urethane functional groups and an electrically significant amount of conductive carbon black.

2. The ribbon as in claim 1 in which the thickness of said substrate layer is in the order of magnitude of 14 microns.

3. The ribbon as in claim 1 in which said polyurethane is an aliphatic polyurethane.

4. The ribbon as in claim 1 in which said carbon black is in the order of magnitude of one part by weight and said polyurethane is in the order of magnitude of two parts by weight and the resistivity of said polyurethane layer is in the order of magnitude of 0.6 ohm-centimeters.

5. The ribbon as in claim 4 in which said polyurethane is an aliphatic polyurethane.

6. The ribbon as in claim 5 in which the thickness of said substrate layer is in the order of magnitude of 14 microns.

7. The ribbon as in claim 4 in which the thickness of said substrate layer is in the order of magnitude of 14 microns.

8. A ribbon for non-impact thermal transfer printing having an electrically resistive substrate layer consisting essentially of a polyurethane resin and carbon black, an aluminum layer of thickness in the order of magnitude of 1000 Angstrom on one side of said substrate layer, and a colored transfer layer on said aluminum layer comprising a resin and capable of flowing under the influence of heat.

9. The ribbon as in claim 8 in which the thickness of said substrate layer is in the order of magnitude of 14 micron and said polyurethane is an aliphatic polyurethane.

10. A ribbon for non-impact thermal transfer printing having an electrically resistive substrate layer consisting essentially of a polyurethane resin and carbon black, an aluminum layer of thickness in the order of magnitude of 1000 Angstrom on one side of said substrate layer, a support layer of polyethylene terephthalate on said aluminum layer, and a colored transfer layer on said polyethylene terephthalate layer comprising a resin and capable of flowing under the influence of heat.

11. The ribbon as in claim 10 in which the thickness of said substrate layer is in the order of magnitude of 14 micron and said polyurethane is an aliphatic polyurethane.

12. A ribbon for non-impact thermal transfer printing having a thermal transfer layer and an electrically resistive substrate layer wherein the improvement comprises said resistive substrate layer comprising polyurethane having predominately only urethane functional groups and an electrically significant amount of conductive, particulate material.

13. The ribbon as in claim 12 in which said polyurethane is an aliphatic polyurethane.

14. The ribbon as in claim 12 having an aluminum layer of thickness in the order of magnitude of 1000 Angstrom on the side of said substrate layer between said substrate layer and said thermal transfer layer.

15. The ribbon as in claim 13 having an aluminum layer of thickness in the order of magnitude of 1000 Angstrom on the side of said substrate layer between said substrate layer and said thermal transfer layer.

* * * * *